United States Patent
Braganca et al.

(10) Patent No.: US 9,236,069 B2
(45) Date of Patent: Jan. 12, 2016

(54) METHOD FOR MAKING A CURRENT-PERPENDICULAR-TO-THE-PLANE (CPP) MAGNETORESISTIVE (MR) SENSOR WITH REDUCED-WIDTH SELF-ALIGNED TOP ELECTRODE

(71) Applicant: HGST Netherlands B.V., Amsterdam (NL)

(72) Inventors: Patrick Mesquita Braganca, San Jose, CA (US); Jeffrey R. Childress, San Jose, CA (US); Jordan Asher Katine, Mountain View, CA (US); Yang Li, San Jose, CA (US); Neil Leslie Robertson, Palo Alto, CA (US); Neil Smith, San Jose, CA (US); Petrus Antonius VanDerHeijden, Cupertino, CA (US); Douglas Johnson Werner, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 255 days.

(21) Appl. No.: 13/853,411

(22) Filed: Mar. 29, 2013

(65) Prior Publication Data

US 2014/0291283 A1    Oct. 2, 2014

(51) Int. Cl.
  *G11B 5/39*    (2006.01)
  *G11B 5/31*    (2006.01)
(52) U.S. Cl.
  CPC ............. *G11B 5/398* (2013.01); *G11B 5/3163* (2013.01); *Y10T 29/49032* (2015.01)
(58) Field of Classification Search
  CPC .... G11B 5/3163; G11B 5/1278; G11B 5/398; G11B 2005/3996; G11B 5/39; G11B 5/3903; G11B 5/3116; Y10T 29/49032; Y10T 29/49044; Y10T 29/49046
  See application file for complete search history.

(56) References Cited

U.S. PATENT DOCUMENTS

| | | | |
|---|---|---|---|
| 5,938,941 A * | 8/1999 | Ishiwata et al. | 216/22 |
| 6,180,421 B1 * | 1/2001 | Futai et al. | 438/3 |
| 6,526,649 B2 * | 3/2003 | Ohkawara | 29/603.07 |
| 7,133,263 B2 | 11/2006 | Lee et al. | |
| 7,530,158 B2 | 5/2009 | Araki et al. | |
| 7,640,650 B2 | 1/2010 | Araki et al. | |
| 8,011,084 B2 | 9/2011 | Le et al. | |
| 2006/0273066 A1 | 12/2006 | Bedell et al. | |
| 2008/0062576 A1 | 3/2008 | Heim et al. | |
| 2009/0266790 A1 | 10/2009 | Balamane et al. | |
| 2011/0089139 A1 | 4/2011 | Hong | |
| 2011/0089140 A1 | 4/2011 | Hong | |
| 2012/0063034 A1 | 3/2012 | Hsu et al. | |

OTHER PUBLICATIONS

Kautsky et al., "Atomic Layer Deposition Al2O3 Films for Permanent Magnet Isolation in TMR Read Heads", IEEE Transactions on Magnetics. vol. 44, No. Nov. 11, 2008, pp. 3576-3579.

* cited by examiner

*Primary Examiner* — Livius R Cazan
(74) *Attorney, Agent, or Firm* — Thomas R. Berthold (57) ABSTRACT

A method for making a current-perpendicular-to-the-plane magnetoresistive sensor structure produces a top electrode that is "self-aligned" on the top of the sensor and with a width less than the sensor trackwidth. A pair of walls of ion-milling resistant material are fabricated to a predetermined height above the biasing layers at the sensor side edges. A layer of electrode material is then deposited onto the top of the sensor between the two walls. The walls serve as a mask during angled ion milling to remove outer portions of the electrode layer. The height of the walls and the angle of ion milling determines the width of the resulting top electrode. This leaves the reduced-width top electrode located on the sensor. Because of the directional ion milling using walls that are aligned with the sensor side edges, the reduced-width top electrode is self-aligned in the center of the sensor.

13 Claims, 9 Drawing Sheets

METHOD FOR MAKING A CURRENT-PERPENDICULAR-TO-THE-PLANE (CPP) MAGNETORESISTIVE (MR) SENSOR WITH REDUCED-WIDTH SELF-ALIGNED TOP ELECTRODE

BACKGROUND OF THE INVENTION

1. Field of the Invention

The invention relates generally to a current-perpendicular-to-the-plane (CPP) magnetoresistive (MR) sensor that operates with the sense current directed perpendicularly to the planes of the layers making up the sensor stack, and more particularly to a method for making a CPP-MR sensor having a top electrode with a width less than the sensor trackwidth (TW).

2. Background of the Invention

One type of conventional CPP-MR sensor used as the read head in magnetic recording disk drives is based on the giant magnetoresistance (GMR) effect. A GMR spin-valve sensor has a stack of layers that includes two ferromagnetic layers separated by a nonmagnetic electrically conductive spacer layer, which is typically copper (Cu). One ferromagnetic layer adjacent the spacer layer has its magnetization direction fixed, such as by being pinned by exchange coupling with an adjacent antiferromagnetic layer, and is referred to as the reference layer. The other ferromagnetic layer adjacent the spacer layer has its magnetization direction free to rotate in the presence of an external magnetic field and is referred to as the free layer. With a sense current applied to the sensor, the rotation of the free-layer magnetization relative to the reference-layer magnetization due to the presence of an external magnetic field is detectable as a change in electrical resistance. In addition to CPP-GMR read heads, another type of CPP-MR sensor is a magnetic tunnel junction sensor, also called a tunneling MR or TMR sensor, in which the nonmagnetic spacer layer is a very thin nonmagnetic tunnel barrier layer formed of an electrically insulating material, such as $TiO_2$, MgO, or $Al_2O_3$.

To achieve higher areal density in magnetic recording disk drives, it is necessary to reduce the CPP-MR sensor trackwidth (TW). A reduction in the sensor physical TW is difficult because of the small dimensions required. However, if the sense current passing perpendicularly through the sensor is confined in a narrower channel, this is equivalent to having a sensor with a narrower physical TW. In conventional CPP-MR sensors, the top electrode is typically the same width as the sensor TW, which prevents the current from flowing in a narrower channel.

What is needed is a method for making a CPP-MR sensor with a top electrode that is narrower than the sensor TW so that the current can flow in a narrower channel.

SUMMARY OF THE INVENTION

The invention relates to a method for making a CPP-MR sensor structure with a top electrode that is "self-aligned" on the top of the sensor and has a width less than the sensor trackwidth. A pair of walls of ion-milling resistant material are fabricated to a predetermined height above the biasing layers at the sensor side edges. A layer of electrode material is then deposited onto the top of the sensor between the two walls. The walls serve as a mask during angled ion milling to remove outer portions of the electrode layer. The height of the walls and the angle of ion milling determines the width of the resulting top electrode. This leaves the reduced-width top electrode located on the sensor. Because of the directional ion milling using walls that are aligned with the sensor side edges, the reduced-width top electrode is self-aligned in the center of the sensor.

For a fuller understanding of the nature and advantages of the present invention, reference should be made to the following detailed description taken together with the accompanying figures.

DETAILED DESCRIPTION OF THE INVENTION

Figure 1:
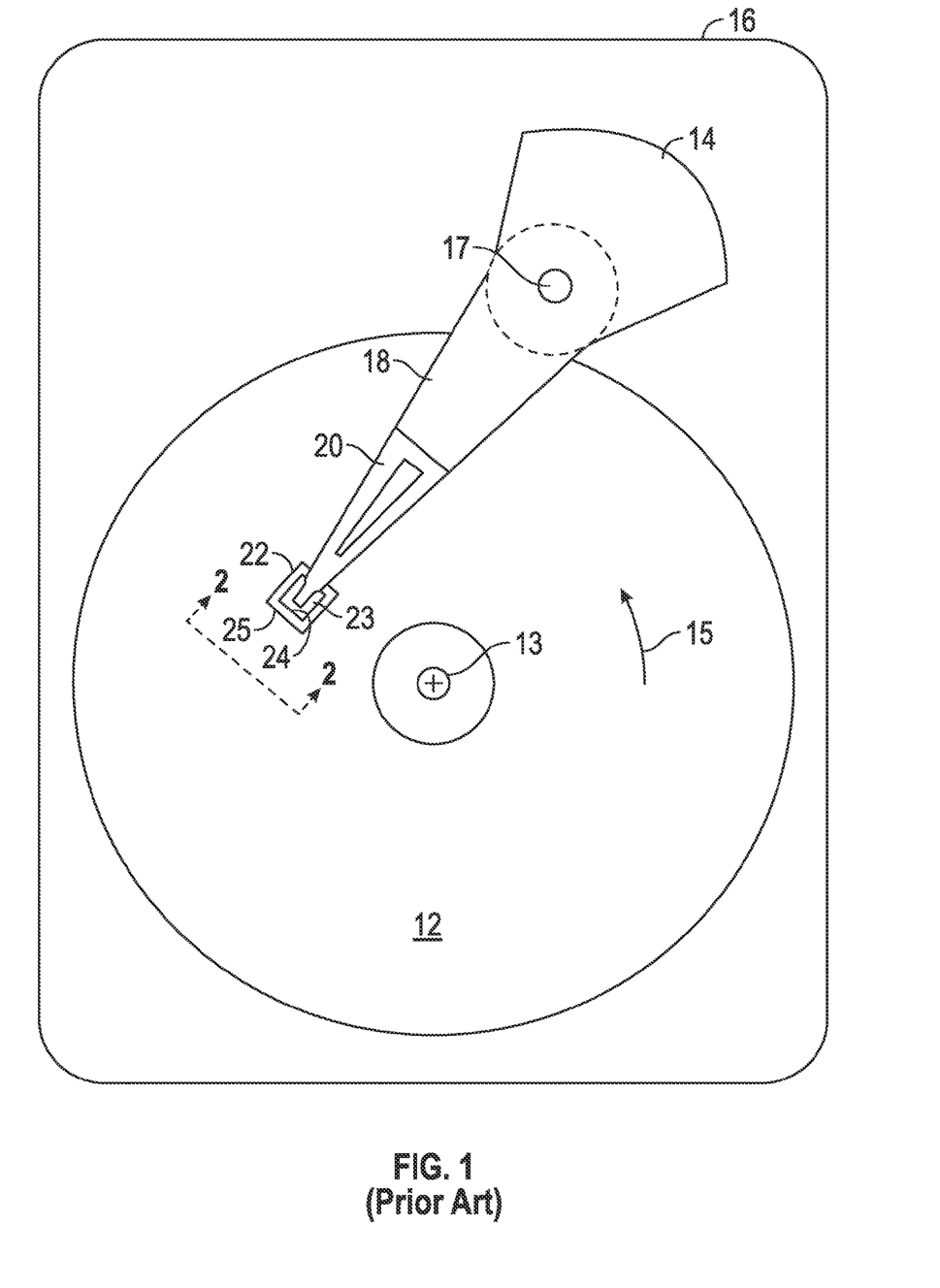
FIG. 1 is a schematic top view of a conventional magnetic recording hard disk drive with the cover removed.

The CPP magnetoresistive (MR) sensor made by the method of this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
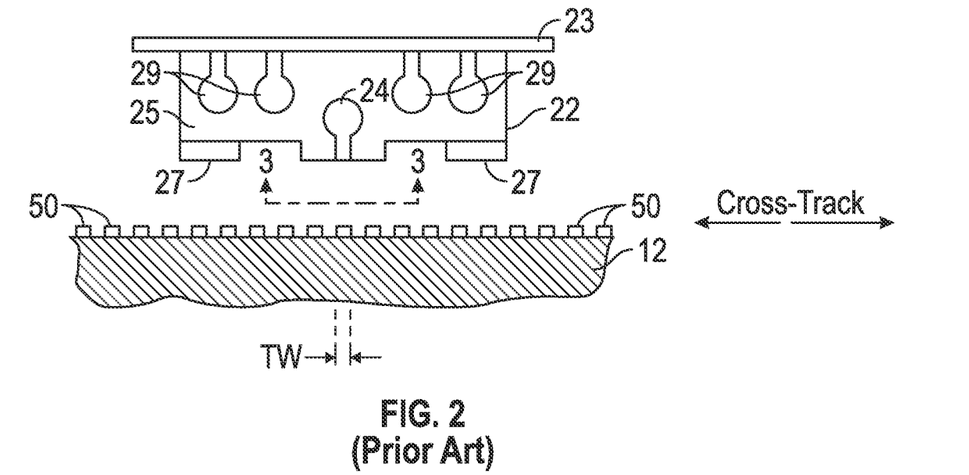
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width trackwidth TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric data tracks with trackwidth TW are created when the write head writes on the continuous recording layer.

Figure 3:
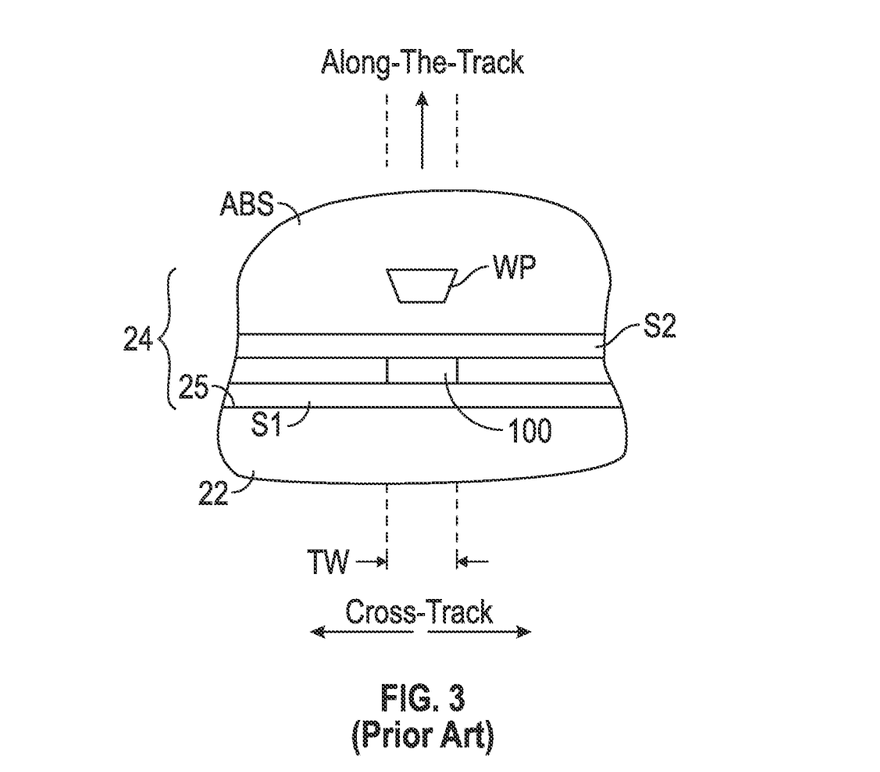
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes a perpendicular magnetic write pole (WP) and may also include trailing and/or side shields (not shown). The CPP-MR sensor or read head 100 is located between two magnetic shields S1 and S2. The shields S1, S2 are formed of magnetically permeable material, typically a NiFe alloy, and may also be electrically conductive so they can function as the electrical leads to the read head 100. The shields function to shield the read head 100 from recorded data bits that are neighboring the data bit being read. Separate electrical leads may also be used, in which case the read head 100 is formed in contact with layers of electrically conducting lead material, such as ruthenium, tantalum, gold, or copper, that are in contact with the shields S1, S2. FIG. 3 is not to scale because of the difficulty in showing very small dimensions. Typically each shield S1, S2 is several microns thick in the along-the-track direction, as compared to the total thickness of the read head 100 in the along-the-track direction, which may be in the range of 20 to 40 nm.

Figure 4:
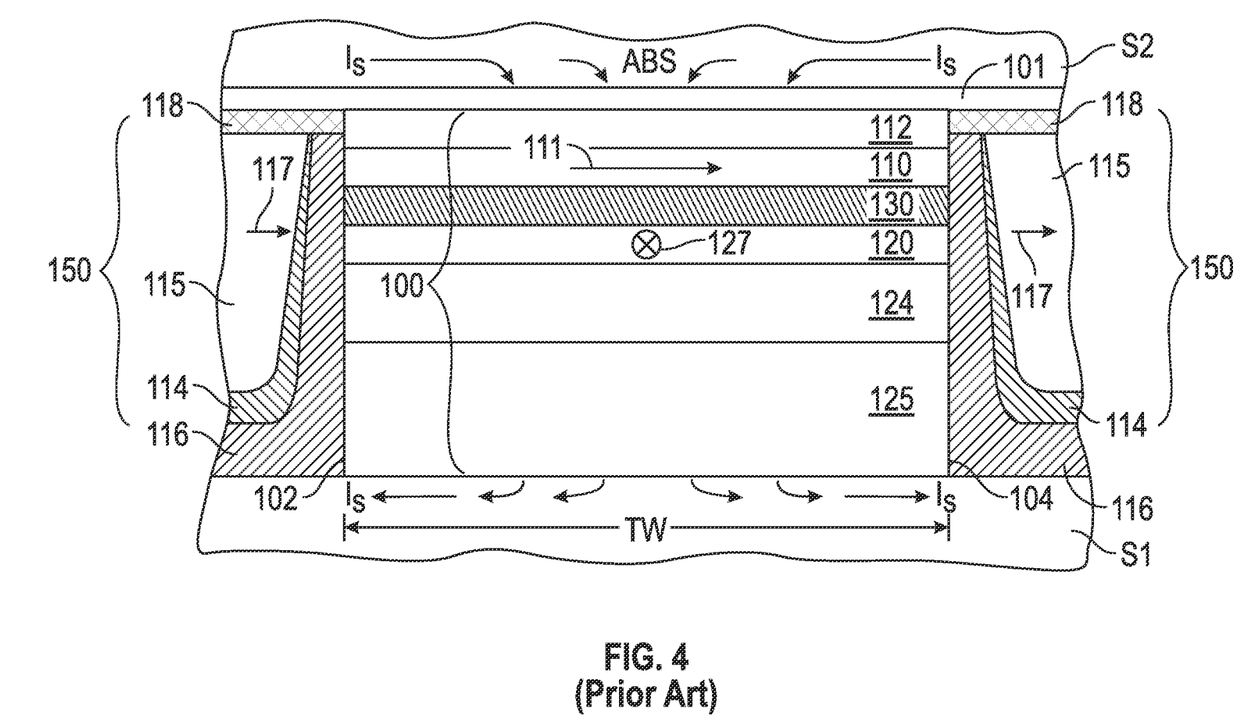
FIG. 4 is a cross-sectional schematic view of a current-perpendicular-to-the-plane magnetoresistive (CPP-MR) read head structure according to the prior art.

FIG. 4 is a view of the ABS showing the layers making up a prior art CPP-MR sensor structure as would be viewed from the disk. Sensor 100 is a CPP-MR read head comprising a stack of layers formed between the two magnetic shield layers S1, S2. The sensor 100 has a front edge at the ABS and spaced-apart side edges 102, 104 that define the trackwidth (TW). The shields S1, S2 are formed of electrically conductive material and thus may also function as electrical leads for the sense current $I_S$, which is directed generally perpendicularly through the layers in the sensor stack. Alternatively, separate electrical lead layers may be formed between the shields S1, S2 and the sensor stack. The lower shield S1 is typically polished by chemical-mechanical polishing (CMP) to provide a smooth substrate for the growth of the sensor stack. A seed layer 101, such as a thin Ru/NiFe bilayer, is deposited, typically by sputtering, below S2 to facilitate the electroplating of the relatively thick S2.

The sensor 100 layers include a ferromagnetic reference layer 120 having a fixed magnetic moment or magnetization direction 121 oriented transversely (into the page), a ferromagnetic free layer 110 having a magnetic moment or magnetization direction 111 that can rotate in the plane of layer 110 in response to transverse external magnetic fields to be sensed from the disk 12, and a nonmagnetic spacer layer 130 between the reference layer 120 and free layer 110. The CPP-MR sensor 100 may be a CPP-GMR sensor, in which case the nonmagnetic spacer layer 130 would be formed of an electrically conducting material, typically a metal or metal alloy like Cu, Au, Ag or AgSn. Alternatively, the CPP-MR sensor 100 may be a CPP tunneling MR (CPP-TMR) sensor, in which case the nonmagnetic spacer layer 130 would be a tunnel barrier formed of an electrically insulating material, like $TiO_2$, MgO or $Al_2O_3$.

The ferromagnetic reference layer in a CPP MR CPP-MR sensor may be part of a well-known antiparallel (AP)-pinned structure, or a single or "simple" pinned layer like that shown in FIG. 4. The simple-pinned ferromagnetic reference layer 120 has its magnetization direction 127 pinned by being exchange coupled to antiferromagnetic (AF) layer 124.

The ferromagnetic reference layer 120 and the free ferromagnetic layer 110 are typically formed of crystalline CoFe or NiFe alloys, amorphous or crystalline CoFeB alloys, or a multilayer of these materials, such as a CoFe/NiFe bilayer. Alternatively, the ferromagnetic layers may comprise a ferromagnetic Heusler alloy with high spin polarization such as $Co_2XY$, where X is Fe, Mn or their alloys and Y is Si, Al, Ge, Ga, Sn or their alloys.

A seed layer 125 may be located between the lower shield layer S1 and the AF layer 124 to enhance the growth of the AF layer 124. The seed layer 125 is typically one or more layers of NiFeCr, NiFe, Ta, Cu or Ru. A capping layer 112 is located between the free ferromagnetic layer 110 and the upper shield layer S2. The capping layer 112 provides corrosion protection and may be a single layer or multiple layers of different materials, such as Ru, Ta, Ti, or a Ru/Ta/Ru, Ru/Ti/Ru, or Cu/Ru/Ta trilayer.

In the presence of an external magnetic field in the range of interest, i.e., magnetic fields from recorded data on the disk, the magnetization direction 111 of free layer 110 will rotate while the magnetization direction 127 of reference layer 120 will remain fixed and not rotate. Thus when a sense current $I_S$ is applied from top shield S2 perpendicularly through the sensor stack to bottom shield S1 (or from S1 to S2), the magnetic fields from the recorded data on the disk will cause rotation of the free-layer magnetization 111 relative to the reference-layer magnetization 127, which is detectable as a change in electrical resistance.

A ferromagnetic biasing structure 150 is formed outside of the sensor stack near the side edges 102, 104 of the sensor 100, particularly near the side edges of free layer 110. The structure 150 includes a ferromagnetic biasing layer 115, which may be a high crystalline anisotropy ($K_u$) and thus high coercivity ($H_c$) layer, i.e., a "hard bias" layer. The structure 150 also includes a seed layer 114 below the biasing layer 115 and a capping layer 118 on the biasing layer 115. The structure 150 is electrically isolated from side edges 102, 104 of sensor 100 by a thin electrically insulating layer 116, which is typically alumina ($Al_2O_3$) but may also be a silicon nitride ($SiN_x$) or another metal oxide like a Ta oxide or a Ti oxide. The shield layer S1 serves as a substrate for the hard biasing structure 150, with the insulating layer 116 being located between the biasing structure 150 and S1. The seed layer 114 is deposited on the insulating layer 116. The biasing layer 115 has a magnetization 117 generally parallel to the ABS and thus longitudinally biases the magnetization 111 of the free layer 110. Thus in the absence of an external magnetic field the magnetization 117 of biasing layer 115 is parallel to the magnetization 111 of the free layer 110.

To achieve higher areal density in magnetic recording, it is necessary to reduce the CPP-MR sensor TW. A reduction in the physical TW is difficult because of the small dimensions required. However, if the sense current $I_s$ passing through the sensor is confined in a narrower channel, this is equivalent to having a sensor with narrower physical TW. As shown in the prior art sensor of FIG. 4, the entire top shield S2 functions as the top electrode and thus sense current $I_s$ passes through the entire sensor between side edges 102 and 104 to bottom shield S1.

Figure 5:
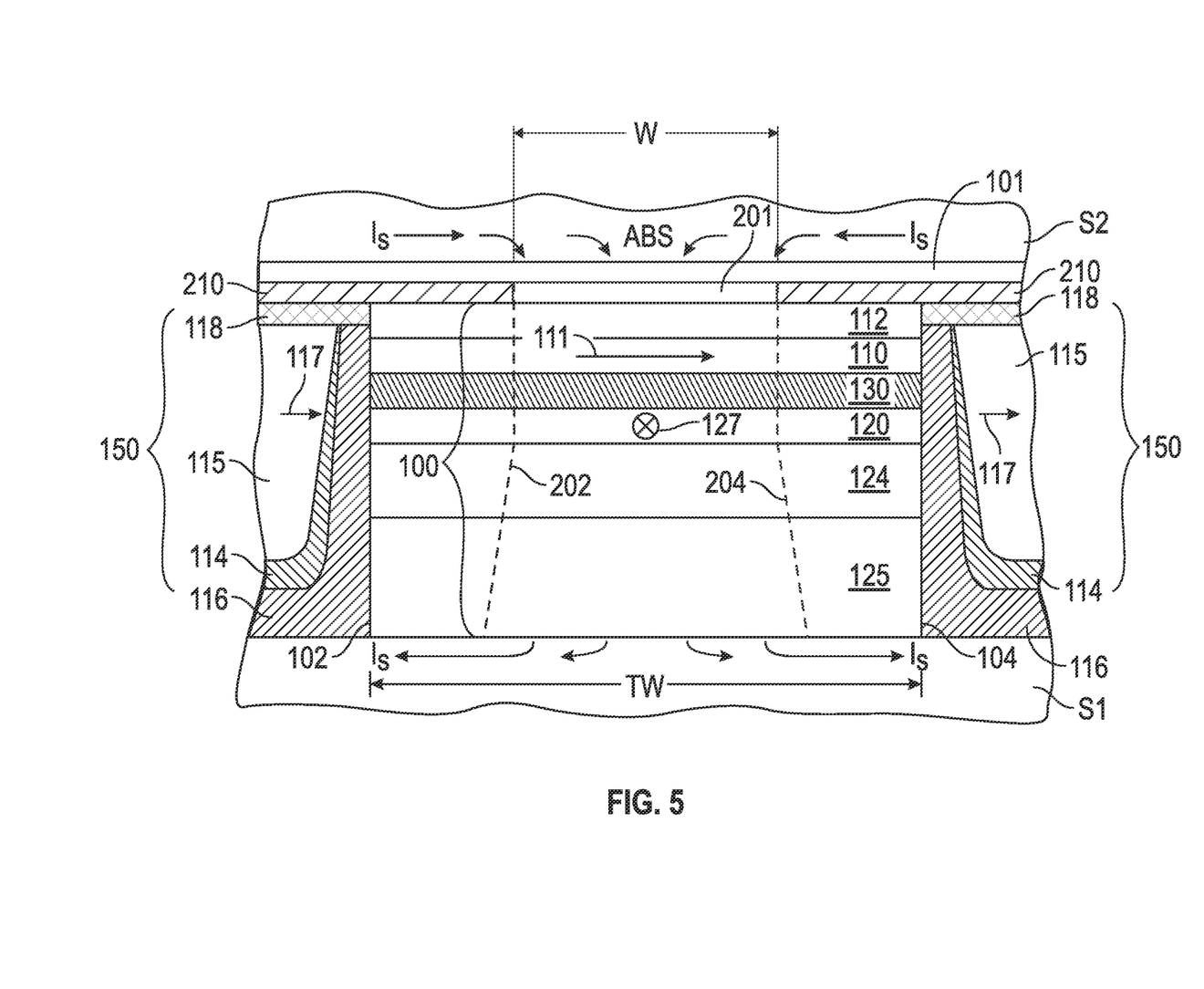
FIG. 5 is a cross-sectional schematic view of a CPP-MR read head structure with a reduced-width top electrode according to the invention.

FIG. 5 is a view of the ABS showing the layers making up a CPP-MR sensor structure with a reduced-width top electrode. As would be viewed from the disk, the sensor structure includes a top electrode 201 having a width W less than TW, in this example W is about one-half TW. The top electrode 201 is formed of electrically conductive material, and is surrounded by an insulating material 210. The sense current Is is confined to enter the top of the sensor 100 through the top electrode 201 and because of the relatively short conductive path, i.e., the thickness of the stack of layers in sensor 100, the current does not spread out significantly before it reaches the bottom electrode, shield S1. The sensor thus has an effective TW defined by dashed lines 202, 204, which increases the sensitivity of the sensor, i.e., the ability to sense smaller magnetic bit sizes from the disk. However, it is difficult to fabricate the top electrode 201 to be precisely aligned in the center of the sensor using conventional lithographic techniques.

This invention is a method for making the sensor structure with the top electrode "self-aligned" with the sensor, i.e., the top electrode 201 becomes precisely aligned on the top of sensor 100 because it is fabricated with reference to the sensor side edges 102, 104. A pair of walls are fabricated above the biasing layer to a predetermined height and aligned with the sensor side edges 102, 104. A layer of electrode material is then deposited onto the top of the sensor between the two walls. The walls serve as a mask during angled ion milling to remove outer portions of the electrode layer. The height of the walls and the angle of ion milling determines the width W of the resulting top electrode.

Figure 6A:
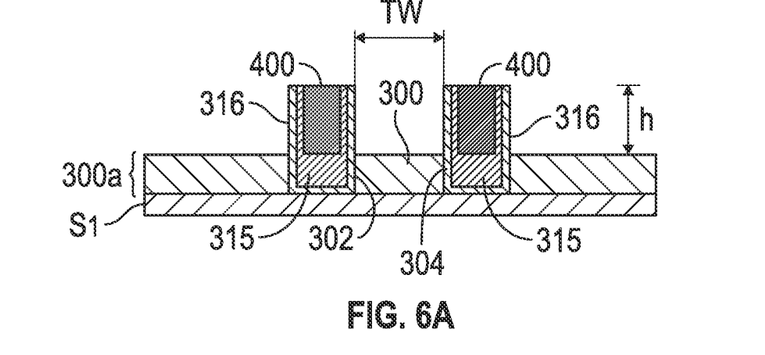
FIGS. 6A-6F illustrate the steps in forming the reduced-width self-aligned top electrode using the method of this invention.
Figure 6B:
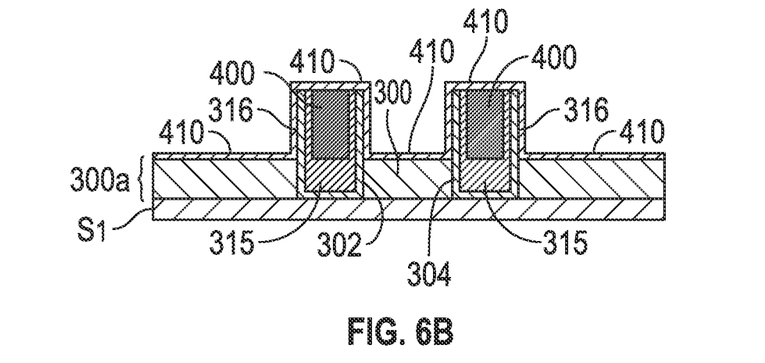
Figure 6C:
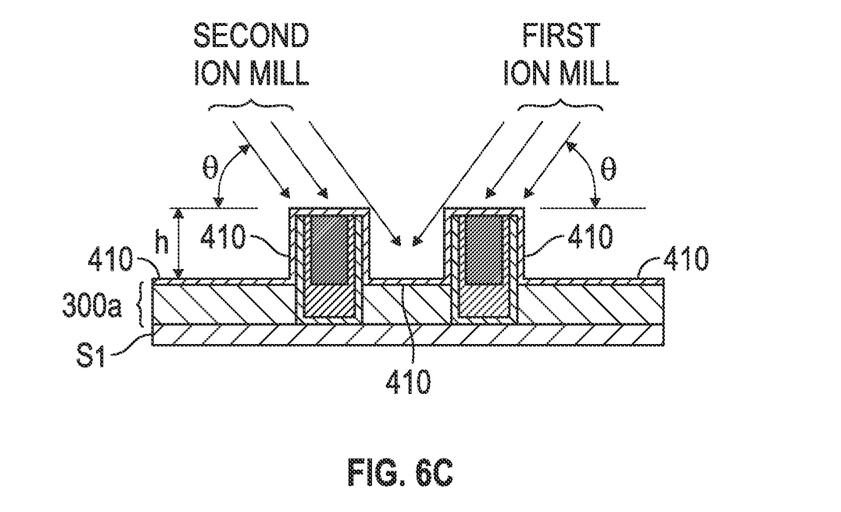
Figure 6D:
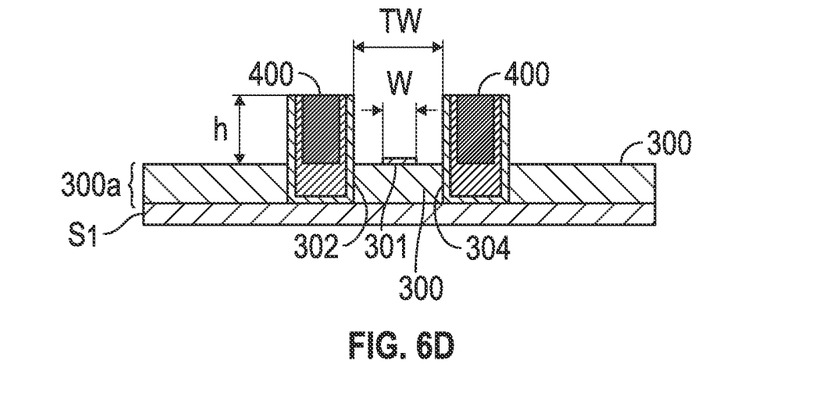
Figure 6E:
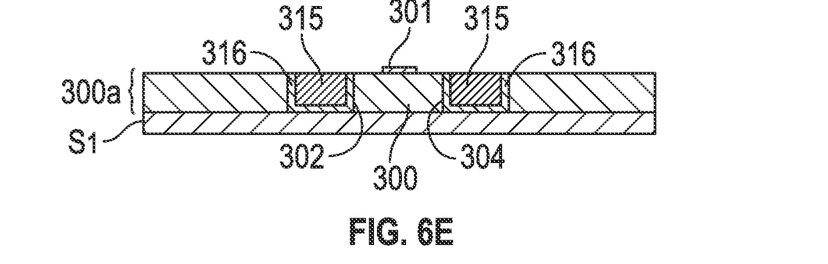
Figure 6F:
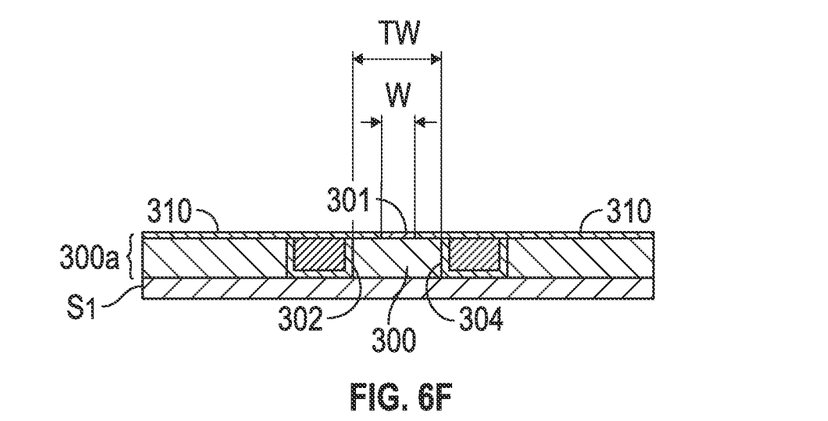

FIGS. 6A-6F illustrate the steps in forming the self-aligned top electrode. FIG. 6A is a side sectional view of a plane parallel to the ABS showing the sensor stack 300a on shield S1 with sensor 300 having side edges 302, 304 defining the TW. Adjacent each sensor side edge 302, 304 is a thin insulating layer 316 and a ferromagnetic biasing layer 315. The insulating layer 316 acts as an electrical isolation layer to separate the biasing layer 315 from the sensor stack 300. Walls 400 of ion-milling resistant material, for example alumina, a titanium oxide (TiOx) or a tantalum oxide (TaOx), are formed to a predetermined height "h" on top of each ferromagnetic biasing layer 315, with the sensor 300 being located between the two walls 400. In FIG. 6B a layer 410 of electrode material is deposited over the walls 400 and on the top of sensor 300. The electrode layer 410 may be formed of a low-resistivity metal, such as Cr, W, Cu or Au, or their alloys, and is deposited to a thickness in the range of about 2 to 6 nm. Then in FIG. 6C the electrode layer 410 is subjected to directional ion milling, first from one side using a first one of the walls 400 as an ion-milling mask, and then from the opposite side using the second one of the walls 400 as an ion-milling mask. The ion milling is performed at an acute angle $\theta$ relative to the electrode layer 410. In FIG. 6D this removes all of the electrode layer 410 except for a portion 301 above the sensor 310 which has a width W reduced from the sensor TW. The angle $\theta$ and the height h of the walls 400 determines the resulting width W. For example, if TW is 30 nm and it is desired to make the top electrode have a width W of 20 nm, then 5 nm would be ion-milled from each side. This can be accomplished with h$\approx$25 nm and $\theta\approx$45 degrees, or h$\approx$45 nm and $\theta\approx$60 degrees. The ion-milling can be performed with Ar ions using a Ion Beam Etching (IBE) tool. After the first ion milling step the structure is rotated 180 degrees about an axis orthogonal to the electrode layer 410 and then the second ion milling step is performed. In FIG. 6E the walls 400 have been etched away, for example by a EDTA (ethylenediaminetetraacetic acid) wet etch if the walls 400 were formed of alumina, and the remaining insulating layers 316 and ferromagnetic biasing layers 315 removed by a chemical-mechanical polishing (CMP) step. In FIG. 6F, a thin insulating layer 310, for example diamond-like carbon (DLC) or alumina, has been deposited over the structure by atomic layer deposition, including over electrode 301, and then removed from above the electrode 301 by a "soft" CMP, i.e., CMP for a very short time at a low pressure. This leaves the reduced-width top electrode 301 located on the sensor 310 and between portions of the insulating layer 310. Because of the directional ion milling using walls 400 that are aligned with the sensor side edges 302, 304, the top electrode 301 is self-aligned in the center of sensor 300.

Figure 7A:
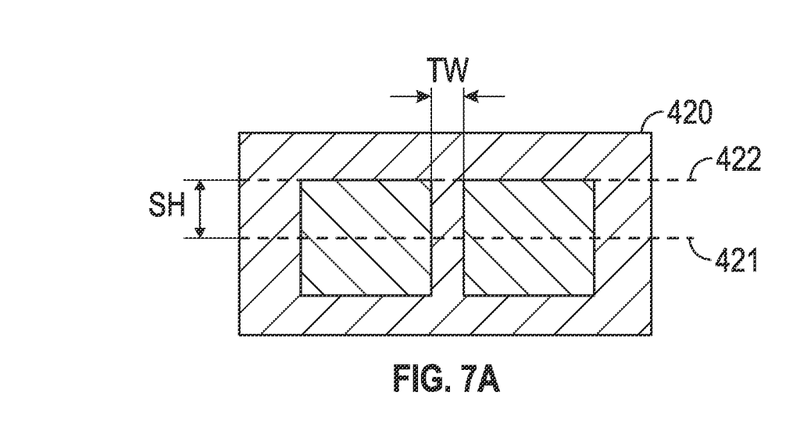
FIGS. 7A-7K illustrate the method of forming the structure of FIG. 6A with the walls above the ferromagnetic biasing layers and adjacent the sensor.
Figure 7B:
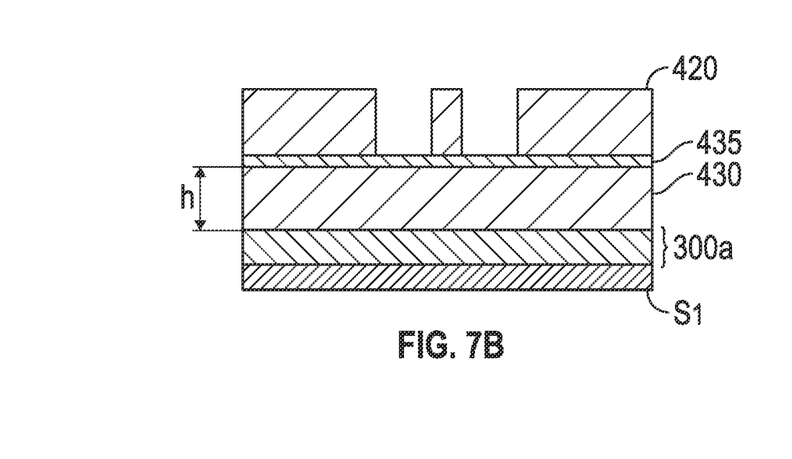
Figure 7C:
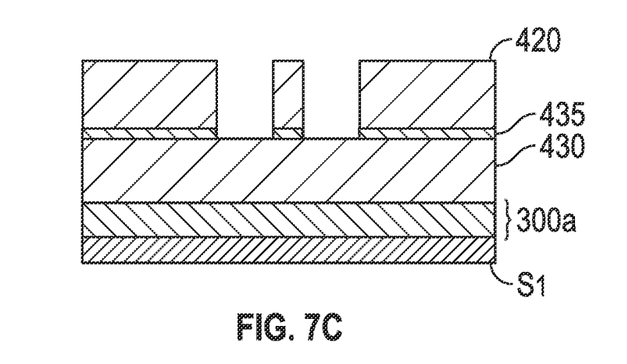
Figure 7D:
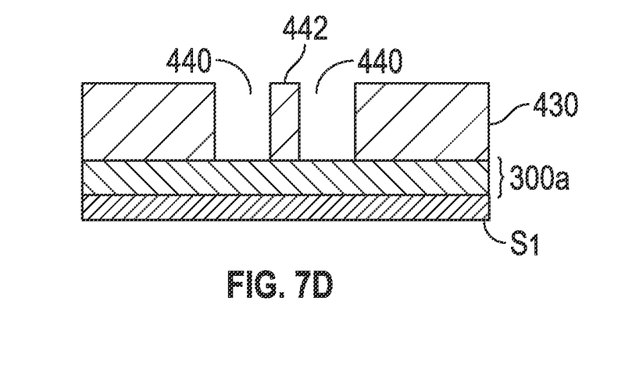
Figure 7E:
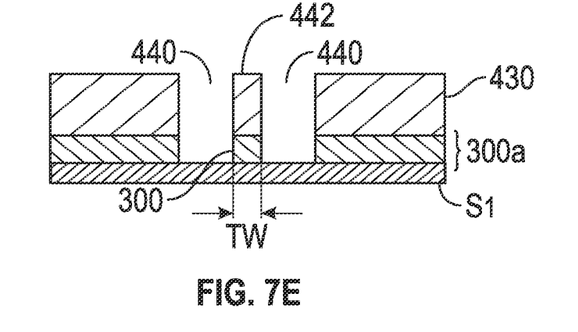
Figure 7F:
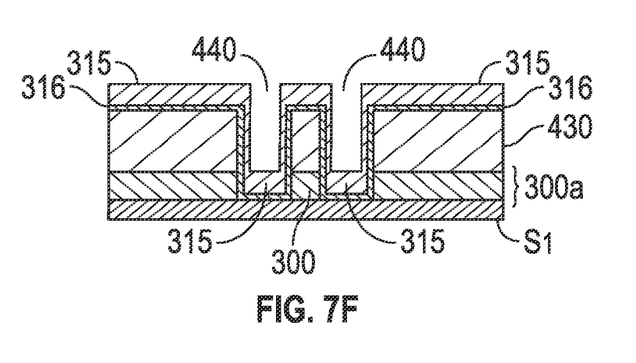
Figure 7G:
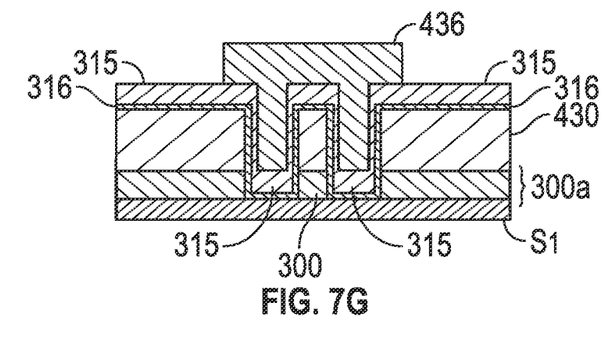
Figure 7H:
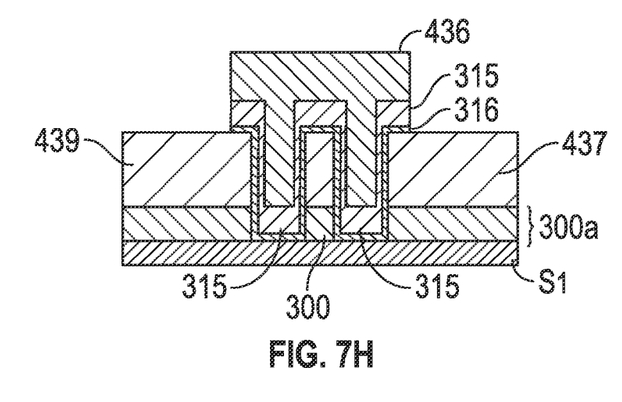
Figure 7I:
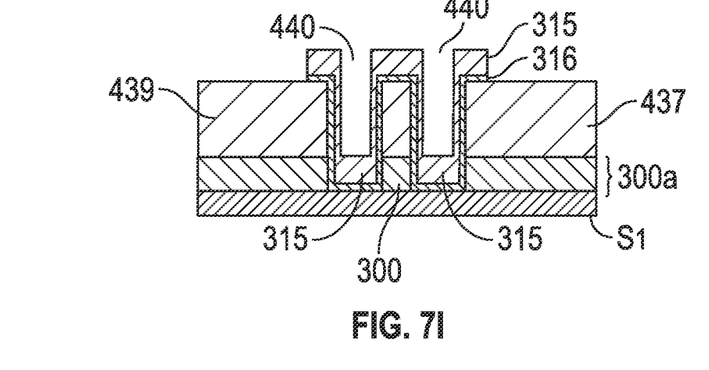
Figure 7J:
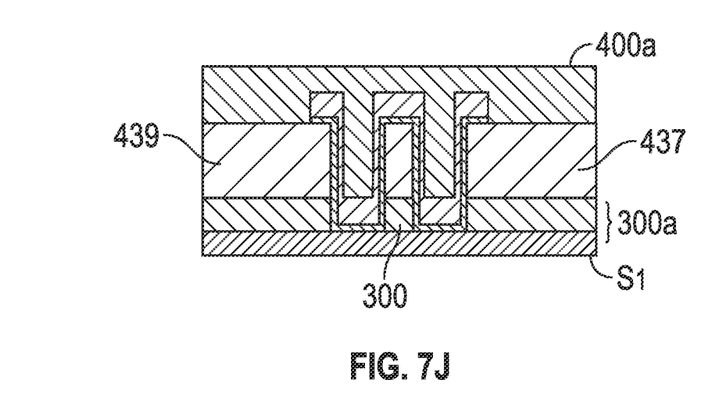
Figure 7K:
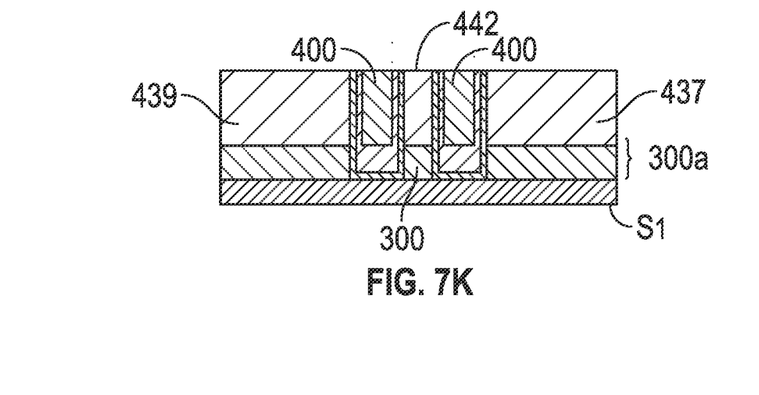

FIGS. 7A-7K illustrate the method of forming the structure of FIG. 6A with the walls above the ferromagnetic biasing layers. FIG. 7A is a top plan view of the patterned resist 420 on the structure prior to the processing steps. Line 421 is an edge view of a plane parallel to the ABS and line 422 is an edge view of a back plane. After all the processing steps the resulting sensor will have a TW approximately equal to the width of center resist stripe and a stripe height (SH) approximately equal to the spacing between planes defined by lines 421, 422. FIG. 7B is a sectional view of the plane defined by line 421, i.e., a plane parallel to the ABS. The stack 300a of layers making up the sensor are deposited on shield S1. A spacer layer 430, which will function as a hard mask layer, is deposited on sensor stack 300a to a thickness approximately equal to h, the height of walls 400 in FIG. 6A. The spacer layer 430 is preferably DLC, but alternatively may be formed of a titanium oxide (TiOx) or a tantalum oxide (TaOx). The spacer layer 430 is a hard mask material that should have the properties of low mill rate and the ability to be removed by reactive ion etching (RIE) without damaging the sensor stack. A mask layer 435, preferably of silicon oxynitride (SiON), is deposited to a thickness of approximately 10 nm on spacer layer 430. Alternative materials for mask layer 435 include SiO2, SiNx, or any material which is resistant to the etchant used to subsequently etch the underlying spacer layer 430. In FIG. 7C, the exposed SiON has been removed in the exposed areas by fluorine-based RIE. In FIG. 7D, the spacer layer 430 has been etched, using the SiON mask 435, by oxygen-based reactive ion etching (RIE), and the SiON and resist removed, leaving a patterned spacer layer 430 having trenches 440 and a pillar 442 of hard mask material above the sensor stack 300a. In FIG. 7E, the sensor stack 300a in the trenches 440 is milled away by an Ar based milling process, using the patterned spacer layer 430 as a hard mask. This results in defining the actual sensor 300 with a width approximately equal to TW below the hard mask pillar 442. In FIG. 7F, a thin insulating layer 316 as an electrical isolation layer is deposited to a thickness of approximately 3 to 4 nm by atomic layer deposition (ALD) or ion beam deposition (IBD) into the trenches 440 and along the side edges 302, 304 of sensor 300, followed by deposition of the ferromagnetic biasing layer 315 on the insulating layer 316. The insulating layer 316 is typically formed of alumina ($Al_2O_3$), but may also be a silicon nitride ($SiN_x$) or another metal oxide like a Ta oxide or a Ti oxide. In FIG. 7G photoresist 436 is patterned over the biasing layer 315 and into the trenches 440. In FIG. 7H the biasing layer 315 and insulating layer 316 are etched away, using the resist 436 as a mask, by a process of Ar based ion milling, leaving side regions 437, 439 of spacer material. In FIG. 7I, the resist 436 has been stripped, leaving trenches 440. In FIG. 7J, a layer 400a of ion-milling resistant material is deposited into the trenches 440 and over the biasing layer 315 and spacer material side regions 437, 439, followed by CMP to provide a relatively smooth surface of ion-milling resistant material. The ion-milling resistant material is preferably alumina, but may alternatively be a TaOx, a TiOx or any material that is resistant to the ion-milling process subsequently used to pattern the top electrode. In FIG. 7K, CMP removes the ion-milling resistant material 400a, the biasing layer 315 and insulating layer 316 down to the spacer material. This leaves a relatively smooth surface of spacer material side regions 437, 439, spacer pillar 442 and walls 400 of ion-milling resistant material. The spacer material in side regions 437, 439 and pillar 412 is then removed, by RIE, leaving the structure of FIG. 6A ready for the deposition of the electrode layer 301.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for making a magnetoresistive sensor structure, the structure including a substrate, a sensor stack on the substrate and having a width and side edges, an isolation layer adjacent each sensor stack side edge and a ferromagnetic biasing layer adjacent each isolation layer, the method comprising;
   forming on each biasing layer a wall of ion-milling resistant material whereby the sensor stack is located between said two walls;
   depositing on the sensor stack in the region between said two walls a layer of electrode material;
   ion milling the layer of electrode material, at an acute angle relative to the layer of electrode material, using a first of said two walls as a mask, to remove a portion of said electrode layer adjacent the second of said two walls; and
   ion milling the layer of electrode material, at an acute angle relative to the layer of electrode material, using the second of said two walls as a mask, to remove a portion of said electrode layer adjacent the first of said two walls, whereby the electrode layer has a width less than the width of the sensor stack.

2. The method of claim 1 further comprising:
   after ion milling the layer of electrode material using a first of said two walls as a mask, rotating the sensor structure 180 degrees about an axis orthogonal to the electrode layer.

3. The method of claim 1 further comprising:
   after ion milling using the second of said two walls as a mask, depositing an insulating layer on the sensor stack adjacent the side edges of the electrode layer.

4. The method of claim 3, wherein depositing an insulating layer on the sensor stack comprises depositing said insulating layer on top of said electrode layer and, thereafter, chemical-mechanical-polishing the insulating layer to expose the underlying electrode layer.

5. The method of claim 1, wherein forming on each biasing layer a wall of ion-milling resistant material comprises forming a wall of an oxide of one of Al, Ta and Ti.

6. The method of claim 1, wherein depositing a layer of electrode material comprises depositing a layer of material selected from Cr, W, Cu, Au and their alloys.

7. The method of claim 1, wherein forming on each biasing layer a wall of ion-milling resistant material comprises:
   depositing on the sensor stack a layer of spacer material to a predetermined thickness;
   patterning a resist layer on the spacer layer;
   etching the spacer layer in the regions unprotected by the resist to form trenches in the spacer layer on the sides of the sensor stack, leaving a pillar of spacer material above the sensor stack;
   depositing an isolation layer of electrically insulating material in the trenches and on the sides of the sensor stack;
   depositing a layer of ferromagnetic material on the isolation layer;
   depositing the ion-milling resistant material onto the ferromagnetic material in the trenches and on the spacer layer outside the trenches;
   polishing the ion-milling resistant material down to the spacer layer; and
   removing the remaining spacer material, leaving said two walls of ion-milling resistant material with the sensor stack between said two walls.

8. The method of claim 1, wherein depositing the spacer layer material comprises depositing a spacer layer formed of material selected from diamond-like carbon (DLC), a titanium oxide and a tantalum oxide.

9. A method for making a magnetoresistive sensor structure, the method comprising:
   providing a substrate;
   forming on the substrate a sensor stack having side edges defining a trackwidth (TW);
   forming a biasing structure adjacent each sensor stack side edge;
   forming on each biasing structure a wall of ion-milling resistant material whereby the sensor stack is located between said two walls;
   depositing on the sensor stack in the region between said two walls a layer of electrode material;
   ion milling the layer of electrode material, at an acute angle relative to the layer of electrode material, using a first of said two walls as a mask, to remove a portion of said electrode layer adjacent the second of said two walls;
   ion milling the layer of electrode material, at an acute angle relative to the layer of electrode material, using the second of said two walls as a mask, to remove a portion of said electrode layer adjacent the first of said two walls, whereby the electrode layer has side edges defining a width (W) less than TW;
   depositing an insulating layer on the sensor stack and the electrode layer; and
   chemical-mechanical-polishing the insulating layer to expose the underlying electrode layer, leaving insulating material on the sensor stack adjacent the side edges of the electrode layer.

10. The method of claim 9 further comprising:
    after ion milling the layer of electrode material using a first of said two walls as a mask, rotating the sensor structure 180 degrees about an axis orthogonal to the electrode layer.

11. The method of claim 9, wherein forming on each biasing structure a wall of ion-milling resistant material comprises forming a wall of an oxide of one of Al, Ta and Ti.

12. The method of claim 9, wherein depositing a layer of electrode material comprises depositing a layer of material selected from Cr, W, Cu, Au and their alloys.

13. The method of claim 9, wherein forming on each biasing structure a wall of ion-milling resistant material comprises:
    depositing on the sensor stack a layer of diamond-like carbon (DLC) to a predetermined thickness;

patterning a resist layer on the DLC layer;
etching the DLC layer in the regions unprotected by the resist to form trenches in the DLC layer on the sides of the sensor stack, leaving a pillar of DLC above the sensor stack;
depositing an isolation layer of electrically insulating material in the trenches and on the sides of the sensor stack;
depositing a layer of ferromagnetic material on the isolation layer;
depositing the ion-milling resistant material onto the ferromagnetic material in the trenches and on the DLC layer outside the trenches;
polishing the ion-milling resistant material down to the DLC layer; and
removing the remaining DLC, leaving said two walls of ion-milling resistant material with the sensor stack between said two walls.

\* \* \* \* \*